US011883843B2

(12) United States Patent
Pankoke

(10) Patent No.: US 11,883,843 B2
(45) Date of Patent: Jan. 30, 2024

(54) METHOD FOR PRODUCING A STRUCTURED SURFACE

(71) Applicant: Hymmen GmbH Maschinen-und Anlagenbau, Bielefeld (DE)

(72) Inventor: René Pankoke, Bielefeld (DE)

(73) Assignee: Hymmen GmbH Maschinen-und Anlagenbau, Bielefeld (DE)

( * ) Notice: Subject to any disclaimer, the term of this patent is extended or adjusted under 35 U.S.C. 154(b) by 874 days.

(21) Appl. No.: 16/494,310

(22) PCT Filed: Jun. 13, 2018

(86) PCT No.: PCT/EP2018/065738
§ 371 (c)(1),
(2) Date: Sep. 16, 2019

(87) PCT Pub. No.: WO2018/229170
PCT Pub. Date: Dec. 20, 2018

(65) Prior Publication Data

US 2020/0368777 A1 Nov. 26, 2020

(30) Foreign Application Priority Data

Jun. 13, 2017 (DE) ..................... 10 2017 113 035.7
Jun. 13, 2017 (DE) ..................... 10 2017 113 036.5
(Continued)

(51) Int. Cl.
*B05D 3/12* (2006.01)
*B05D 3/06* (2006.01)
(Continued)

(52) U.S. Cl.
CPC ............... *B05D 3/12* (2013.01); *B05D 3/002* (2013.01); *B05D 3/0486* (2013.01); *B05D 3/067* (2013.01);
(Continued)

(58) Field of Classification Search
CPC ........ B05D 3/12; B05D 3/002; B05D 3/0486; B05D 3/067; B05D 5/02; B05D 7/584;
(Continued)

(56) References Cited

U.S. PATENT DOCUMENTS 692,701 A 2/1902 Burner
3,308,227 A 3/1967 Power et al.
(Continued)

FOREIGN PATENT DOCUMENTS

AT 387621 2/1989
CA 2406991 11/2001
(Continued)

OTHER PUBLICATIONS

"formation," Merriam-Webster.com Dictionary, https://www.merriam-webster.com/dictionary/formation. Accessed May 24, 2023. (Year: 2023).*

(Continued)

*Primary Examiner* — William P Fletcher, III

(57) ABSTRACT

A method for producing a decorative surface on a workpiece (1) is disclosed, the method comprising the following steps:
- feeding (S10) of the workpiece (1) coated with a liquid layer (2) to a digital printing station;
- application (S12) of an agent capable of at least partially absorbing electromagnetic radiation, at least on a partial area of the surface of the liquid layer (2), or which, in contact with the surface, produces a reaction product which is capable of at least partially absorbing electromagnetic radiation;
- irradiation (S14) of the surface of the liquid layer (2) and of the agent with electromagnetic radiation having a wavelength of less than 300 nm, preferably less than 250 nm, particularly preferably less than 200 nm.
(Continued)

Furthermore, an apparatus (1) for carrying out this method is disclosed.

12 Claims, 5 Drawing Sheets

(30) Foreign Application Priority Data

| | | |
|---|---|---|
| Feb. 19, 2018 | (EP) | 18157511 |
| Mar. 14, 2018 | (EP) | 18161725 |
| Mar. 16, 2018 | (EP) | 18162382 |
| Apr. 19, 2018 | (EP) | 18168263 |

(51) Int. Cl.

| | |
|---|---|
| ***B05D 5/02*** | (2006.01) |
| ***B05D 7/00*** | (2006.01) |
| ***B05D 3/04*** | (2006.01) |
| ***B05D 5/06*** | (2006.01) |
| ***B41M 7/00*** | (2006.01) |
| ***B44C 3/02*** | (2006.01) |
| ***B41F 23/08*** | (2006.01) |
| ***B41M 3/06*** | (2006.01) |
| ***B41M 5/00*** | (2006.01) |
| ***B05D 3/00*** | (2006.01) |
| ***B41J 11/00*** | (2006.01) |
| ***B41J 2/21*** | (2006.01) |
| ***B41J 3/407*** | (2006.01) |
| *B44C 5/04* | (2006.01) |
| *B44F 1/02* | (2006.01) |
| *B44F 9/02* | (2006.01) |
| *E04F 13/08* | (2006.01) |
| *E04F 15/10* | (2006.01) |
| *B44F 11/04* | (2006.01) |

(52) U.S. Cl.

CPC ............... *B05D 5/02* (2013.01); *B05D 7/584* (2013.01); *B41F 23/08* (2013.01); *B41J 2/2114* (2013.01); *B41J 3/407* (2013.01); *B41J 11/002* (2013.01); *B41J 11/0015* (2013.01); *B41M 3/06* (2013.01); *B41M 5/0047* (2013.01); *B41M 7/009* (2013.01); *B41M 7/0027* (2013.01); *B41M 7/0045* (2013.01); *B41M 7/0054* (2013.01); *B41M 7/0081* (2013.01); *B44C 3/02* (2013.01); *B05D 5/061* (2013.01); *B44C 5/04* (2013.01); *B44F 1/02* (2013.01); *B44F 9/02* (2013.01); *B44F 11/04* (2013.01); *E04F 13/0873* (2013.01); *E04F 15/107* (2013.01)

(58) Field of Classification Search

CPC .......... B41F 23/08; B41J 2/2114; B41J 3/407; B41J 11/0015; B41J 11/002; B41M 3/06; B41M 5/0047; B41M 7/0027; B41M 7/0045; B41M 7/0054; B41M 7/0081; B41M 7/009; B44C 5/04; B44C 3/02; B44C 5/061; B44F 11/04; B44F 1/02; B44F 9/02; E04F 13/0873; E04F 15/107; E04F 15/02

See application file for complete search history.

(56) References Cited

U.S. PATENT DOCUMENTS

| | | | |
|---|---|---|---|
| 3,580,768 | A | 5/1971 | Kukla |
| 3,676,963 | A | 7/1972 | Rice et al. |
| 4,439,480 | A | 3/1984 | Sachs et al. |
| 4,513,299 | A | 4/1985 | Lee et al. |
| 4,557,778 | A | 12/1985 | Held |
| 4,668,765 | A | 5/1987 | Drawert et al. |
| 5,178,928 | A | 1/1993 | Goto et al. |
| 5,306,783 | A | 4/1994 | Kirchgaessner et al. |
| 5,358,737 | A | 10/1994 | Muees et al. |
| 5,779,779 | A | 7/1998 | Jolly |
| 6,120,845 | A | 9/2000 | Pease |
| 6,150,009 | A | 11/2000 | Stecker |
| 6,193,361 | B1 | 2/2001 | Wen |
| 6,354,686 | B1 | 3/2002 | Tanaka et al. |
| 6,375,777 | B1 | 4/2002 | Sjolin et al. |
| 6,589,357 | B1 | 7/2003 | Wandres |
| 6,621,087 | B1 | 9/2003 | Bisges et al. |
| 6,830,305 | B1 | 12/2004 | Takizawa |
| 6,927,014 | B1 † | 8/2005 | Figov |
| 7,001,016 | B2 | 2/2006 | Baxter et al. |
| 9,266,382 | B2 | 2/2016 | Schacht et al. |
| 11,141,759 | B2 | 10/2021 | Pankoke |
| 11,511,318 | B2 | 11/2022 | Pankoke |
| 2002/0018085 | A1 | 2/2002 | Asauchi et al. |
| 2002/0061389 | A1 | 5/2002 | Brooker et al. |
| 2003/0011651 | A1 | 1/2003 | Rupprecht et al. |
| 2003/0152715 | A1 | 8/2003 | Beck et al. |
| 2003/0167717 | A1 | 9/2003 | Garcia |
| 2004/0028830 | A1 | 2/2004 | Bauer |
| 2004/0048171 | A1 | 3/2004 | Grabher et al. |
| 2004/0086678 | A1 | 5/2004 | Chen et al. |
| 2004/0241416 | A1 | 12/2004 | Tian et al. |
| 2005/0103182 | A1 | 5/2005 | Spurgeon |
| 2005/0244571 | A1 | 11/2005 | Walheim |
| 2005/0255249 | A1 | 11/2005 | Schlatterbeck et al. |
| 2006/0075917 | A1 | 4/2006 | Edwards |
| 2006/0130421 | A1 | 6/2006 | Nollet et al. |
| 2006/0163371 | A1 | 7/2006 | Veil |
| 2006/0209108 | A1 | 9/2006 | Hamazaki et al. |
| 2006/0238554 | A1 | 10/2006 | Hosono et al. |
| 2007/0160790 | A1 | 7/2007 | Kaneko et al. |
| 2007/0235410 | A1 | 10/2007 | Wong et al. |
| 2007/0283648 | A1 | 12/2007 | Chen |
| 2007/0296790 | A1 | 12/2007 | Nakazawa et al. |
| 2008/0074482 | A1 | 3/2008 | Makuta et al. |
| 2008/0081116 | A1 | 4/2008 | Makuta et al. |
| 2008/0084466 | A1 | 4/2008 | Makuta et al. |
| 2008/0176039 | A1 | 7/2008 | Chen et al. |
| 2008/0187680 | A1 | 8/2008 | Kawakami et al. |
| 2008/0241481 | A1 † | 10/2008 | Tokumoto |
| 2008/0266371 | A1 * | 10/2008 | Ma ...................... C09D 11/322 347/21 |
| 2008/0280028 | A1 | 11/2008 | Albrecht et al. |
| 2009/0225143 | A1 | 9/2009 | Fukui |
| 2009/0246365 | A1 | 10/2009 | Ito et al. |
| 2010/0092688 | A1 | 4/2010 | Serbutoviez et al. |
| 2011/0067731 | A1 | 3/2011 | Satoh et al. |
| 2011/0157272 | A1 | 6/2011 | Ikehata et al. |
| 2012/0015107 | A1 | 1/2012 | Schacht et al. |
| 2013/0065024 | A1 | 3/2013 | Aruga et al. |
| 2013/0101796 | A1 | 4/2013 | Arzt et al. |
| 2013/0286088 | A1 | 10/2013 | Ryberg et al. |
| 2013/0286095 | A1 | 10/2013 | Wada et al. |
| 2013/0341532 | A1 | 12/2013 | Lee et al. |
| 2014/0017452 | A1 | 1/2014 | Pervan et al. |
| 2014/0343687 | A1 | 11/2014 | Jennissen |
| 2015/0079793 | A1 | 3/2015 | Hattori |
| 2016/0009932 | A1 | 1/2016 | Jang et al. |
| 2016/0114619 | A1 | 4/2016 | Schacht et al. |
| 2016/0205965 | A1 | 7/2016 | Elejalde et al. |
| 2016/0215074 | A1 | 7/2016 | Homma et al. |
| 2016/0238774 | A1 | 8/2016 | Koike et al. |
| 2016/0297223 | A1 | 10/2016 | Langenscheidt et al. |
| 2016/0332479 | A1 | 11/2016 | Clement |
| 2017/0081522 | A1 | 3/2017 | Adam et al. |
| 2017/0333936 | A1 | 11/2017 | Gibson et al. |
| 2018/0056671 | A1 | 3/2018 | Boniface |
| 2020/0016627 | A1 | 1/2020 | Pankoke |
| 2020/0016629 | A1 | 1/2020 | Pankoke |
| 2020/0023662 | A1 | 1/2020 | Pankoke |
| 2020/0040799 | A1 | 2/2020 | Won |
| 2020/0346246 | A1 | 11/2020 | Pankoke |
| 2020/0346395 | A1 | 11/2020 | Pankoke |

(56) References Cited

U.S. PATENT DOCUMENTS

| | | | |
|---|---|---|---|
| 2020/0346484 | A1 | 11/2020 | Pankoke |
| 2021/0268542 | A1 | 9/2021 | Pankoke |
| 2021/0394232 | A1 | 12/2021 | Pankoke |
| 2022/0379343 | A1 | 12/2022 | Pankoke |
| 2022/0379344 | A1 | 12/2022 | Pankokc |
| 2023/0144445 | A1 | 5/2023 | Pankokc |

FOREIGN PATENT DOCUMENTS

| | | | | |
|---|---|---|---|---|
| CA | 2568440 | | 12/2005 | |
| CN | 1166386 | | 12/1997 | |
| CN | 1572380 | | 2/2005 | |
| CN | 1653390 | | 8/2005 | |
| CN | 101116987 | | 2/2008 | |
| CN | 101301821 | | 11/2008 | |
| CN | 101314981 | | 12/2008 | |
| CN | 101342844 | | 1/2009 | |
| CN | 102089088 | | 6/2011 | |
| CN | 102256806 | | 11/2011 | |
| CN | 102834188 | | 12/2012 | |
| CN | 103035983 | | 4/2013 | |
| CN | 103192656 | | 7/2013 | |
| CN | 103209770 | | 7/2013 | |
| CN | 103737464 | | 4/2014 | |
| CN | 104039368 | | 9/2014 | |
| CN | 105377521 | | 3/2016 | |
| CN | 105835589 | | 8/2016 | |
| CN | 207211033 | | 4/2018 | |
| CN | 109395925 | | 3/2019 | |
| DE | 3107798 | | 9/1982 | |
| DE | 3331391 | | 3/1985 | |
| DE | 69119743 | | 1/1997 | |
| DE | 19532819 | | 3/1997 | |
| DE | 19810455 | | 9/1999 | |
| DE | 69709984 | | 9/2002 | |
| DE | 10316695 | | 10/2004 | |
| DE | 60009141 | | 10/2004 | |
| DE | 60007560 | | 12/2004 | |
| DE | 69732819 | | 4/2006 | |
| DE | 102006003798 | | 7/2007 | |
| DE | 10 006042063 | | 3/2008 | |
| DE | 102007019871 | | 10/2008 | |
| DE | 102007055053 | | 5/2009 | |
| DE | 102008024149 | | 12/2009 | |
| DE | 102009004482 | | 7/2010 | |
| DE | 102009043812 | | 3/2011 | |
| DE | 102009044802 | | 12/2011 | |
| DE | 102009044802 | A1 * | 12/2011 | ............ B41J 11/002 |
| DE | 102010052518 | | 5/2012 | |
| DE | 102015107259 | | 11/2016 | |
| DE | 102016120878 | A1 † | 11/2016 | |
| DE | 102015110236 | | 12/2016 | |
| DE | 102015110268 | | 12/2016 | |
| DE | 102016120878 | | 5/2017 | |
| DE | 102016120878 | A1 * | 5/2017 | ........... B05D 3/0209 |
| DE | 102017113035 | | 12/2018 | |
| DE | 4421559 | | 5/2020 | |
| EP | 0019221 | | 11/1980 | |
| EP | 0197267 | | 10/1986 | |
| EP | 0210620 | | 2/1987 | |
| EP | 0210620 | A2 † | 2/1987 | |
| EP | 0553421 | | 8/1993 | |
| EP | 0372097 | | 6/1996 | |
| EP | 0719647 | | 7/1996 | |
| EP | 0810039 | | 12/1997 | |
| EP | 0827838 | | 3/1998 | |
| EP | 1101542 | | 5/2001 | |
| EP | 1294578 | | 3/2003 | |
| EP | 1384595 | | 1/2004 | |
| EP | 1449667 | | 8/2004 | |
| EP | 1454763 | | 9/2004 | |
| EP | 1482085 | | 12/2004 | |
| EP | 1652686 | | 5/2006 | |
| EP | 1652686 | A1 † | 5/2006 | |
| EP | 1685974 | | 8/2006 | |
| EP | 1728639 | | 12/2006 | |
| EP | 1872959 | | 1/2008 | |
| EP | 1902849 | | 3/2008 | |
| EP | 1911594 | | 4/2008 | |
| EP | 1952998 | | 8/2008 | |
| EP | 2042335 | | 4/2009 | |
| EP | 2050514 | | 4/2009 | |
| EP | 1290290 | | 1/2010 | |
| EP | 2174772 | | 4/2010 | |
| EP | 2181860 | | 5/2010 | |
| EP | 2251205 | | 11/2010 | |
| EP | 2280130 | | 2/2011 | |
| EP | 2301762 | | 3/2011 | |
| EP | 2308682 | | 4/2011 | |
| EP | 2343169 | | 7/2011 | |
| EP | 2418019 | | 2/2012 | |
| EP | 2786807 | | 10/2014 | |
| EP | 2857221 | | 4/2015 | |
| EP | 2857221 | A1 * | 4/2015 | ............... B05D 5/02 |
| EP | 2873535 | | 5/2015 | |
| EP | 2873536 | | 5/2015 | |
| EP | 2883712 | | 6/2015 | |
| EP | 3090882 | | 11/2016 | |
| EP | 3109056 | | 12/2016 | |
| EP | 3109056 | A1 † | 12/2016 | |
| EP | 2555878 | | 12/2017 | |
| EP | 3415316 | | 12/2018 | |
| EP | 3415317 | | 12/2018 | |
| EP | 3415318 | | 12/2018 | |
| EP | 3415319 | | 12/2018 | |
| EP | 3466677 | | 4/2019 | |
| EP | 2313281 | | 9/2020 | |
| EP | 3875248 | | 9/2021 | |
| EP | 3995645 | A1 * | 5/2022 | ............ E04F 15/105 |
| ES | 370796 | | 1/1972 | |
| ES | 1018178 | | 1/1992 | |
| ES | 2340456 | | 6/2010 | |
| ES | 2349527 | | 1/2011 | |
| ES | 2586981 | | 10/2016 | |
| FR | 2936965 | | 4/2010 | |
| FR | 2946959 | | 12/2010 | |
| GB | 1405643 | | 9/1975 | |
| JP | 59-169575 | | 9/1984 | |
| JP | 06-270372 | | 9/1994 | |
| JP | 09323434 | | 12/1997 | |
| JP | 2003-285000 | | 10/2003 | |
| JP | 2004-042548 | | 2/2004 | |
| JP | 2004-134760 | | 4/2004 | |
| JP | 2008-093910 | | 4/2008 | |
| JP | 2008-246993 | | 10/2008 | |
| JP | 2010-069684 | | 4/2010 | |
| JP | 2011-173091 | | 9/2011 | |
| JP | 2017-200740 | | 11/2017 | |
| KR | 1020030083066 | | 10/2003 | |
| KR | 1020060004828 | | 1/2006 | |
| KR | 1020090066585 | | 6/2009 | |
| KR | 2010-0120434 | | 11/2010 | |
| RU | 2005132339 | | 4/2007 | |
| WO | WO 90/015673 | | 12/1990 | |
| WO | WO 98/08687 | | 3/1998 | |
| WO | WO 99/012736 | | 3/1999 | |
| WO | WO 99/67227 | | 12/1999 | |
| WO | WO 00/30856 | | 6/2000 | |
| WO | WO 01/47718 | | 7/2001 | |
| WO | WO 02/008346 | | 1/2002 | |
| WO | WO 02/033740 | | 4/2002 | |
| WO | WO 02/068189 | | 9/2002 | |
| WO | WO 2003/099456 | | 12/2003 | |
| WO | WO 2005/116361 | | 12/2005 | |
| WO | WO 2006/037644 | | 4/2006 | |
| WO | WO 2006/080362 | | 8/2006 | |
| WO | WO 2007/026172 | | 3/2007 | |
| WO | WO 2007/088245 | | 8/2007 | |
| WO | WO 2008/089021 | | 7/2008 | |
| WO | WO 2008/110883 | | 9/2008 | |
| WO | WO 2008/132126 | | 11/2008 | |
| WO | WO 2010/070485 | | 6/2010 | |
| WO | WO 2010/079014 | | 7/2010 | |
| WO | WO 2011/064075 | | 6/2011 | |

(56) References Cited

FOREIGN PATENT DOCUMENTS

| | | |
|---|---|---|
| WO | WO 2011/126148 | 10/2011 |
| WO | WO 2014/184418 | 11/2014 |
| WO | WO 2015/078449 | 6/2015 |
| WO | WO 2016/014617 | 1/2016 |
| WO | WO 2016/142510 | 9/2016 |
| WO | WO 2017/204361 | 11/2017 |
| WO | WO 2018/069874 | 4/2018 |
| WO | WO2018069874 A1 † | 4/2018 |
| WO | WO 2020/039361 | 2/2020 |

OTHER PUBLICATIONS

Notice of Allowance dated Aug. 24, 2022 from US Patent and Trademark Office Re. U.S. Appl. No. 16/494,308. (26 pages).
International Search Report and Written Opinion dated Aug. 31, 2018 From the International Searching Authority Re. Application No. PCT/EP2018/065738 and its English Translation. (13 Pages).
Beuth "Paints and Varnishes—Determination of Gloss Value at 20°, 60° and 85° (ISO 2813:2014); German Version EN ISO 2813:2014", Beuth Publishing DIN, 2 P., Feb. 2015.
Official Action dated Dec. 8, 2021 from US Patent and Trademark Office Re. U.S. Appl. No. 16/494,309. (62 pages).
Third Party IDS Submission under 37 CFR 1.290 filed on Nov. 4, 2021 From the US Patent and Trademark Office Re. U.S. Appl. No. 16/865,356.(3 Pages).
Third Party IDS Submission under 37 CFR 1.290 filed on Oct. 15, 2021 From the US Patent and Trademark Office Re. U.S. Appl. No. 16/865,355.(2 Pages).
Third Party Submission under 37 CFR 1.290 filed on Nov. 28, 2021 From the US Patent and Trademark Office Re. U.S. Appl. No. 16/865,358.(3 Pages).
USPTO Communication dated Dec. 1, 2021 RE Third-Party Submission From the US Patent and Trademark Office Re. U.S. Appl. No. 16/865,358.(2 Pages).
USPTO Communication dated Nov. 10, 2021 RE Third-Party Submission From the US Patent and Trademark Office Re. U.S. Appl. No. 16/865,356.(2 Pages).
USPTO Communication dated Oct. 25, 2021 RE Third Party Submission From the US Patent and Trademark Office Re. U.S. Appl. No. 16/865,355.(2 Pages).
Ezzeldin et al. "Improving the Performance of an Inkjet Printhead Using Model Predictive Control," Preprints of the 18th IFAC World Congress, Sep. 2, 2011: 11544-11549.
Wikipedia "Ultraviolet", Wikipedia, the Free Encyclopedia, 29 P., Jun. 12, 2017.
Wikipedia "UV Curing", Wikipedia the Free Encyclopedia, 3 P. Apr. 12, 2017.
Final Official Action dated Feb. 18, 2021 From the US Patent and Trademark Office Re. U.S. Appl. No. 16/494,307. (21 Pages).
Third Party Submission under 37 CFR 1.290 filed on Jan. 29, 2021 From the US Patent and Trademark Office Re. U.S. Appl. No. 16/494,308.(2 Pages).
Third Party Submission under 37 CFR 1.290 filed on Jan. 29, 2021 From the US Patent and Trademark Office Re. U.S. Appl. No. 16/494,309.(2 Pages).
USPTO Communication dated Feb. 11, 2021 RE Third-Party Submission From the US Patent and Trademark Office Re. U.S. Appl. No. 16/494,309.(2 Pages).
USPTO Communication dated Feb. 3, 2021 RE Third-Party Submission From the US Patent and Trademark Office Re. U.S. Appl. No. 16/494,308.(2 Pages).
Wikipedia "Inkjet Printing", Wikipedia, p. 1-15, Last Edited Aug. 31, 2020.
Restriction Official Action dated Jul. 28, 2022 from US Patent and Trademark Office Re. U.S. Appl. No. 16/865,356. (5 pages).
"Barberan Industrial Solutions Since 1929", Barberan, English Transaltion, 10 P., Sep. 25, 2019.
"Darstellung Hilfslinie [Appearance Guideline]", 1 P.
"DIBUJO TEC 1 and TEC 2", 1P.
"Widerspruchsbegruendung and it's machine-translation in English".
"Yupo Corporation, product information", retrieved from the internet on Feb. 25, 2022.
Restriction Official Action dated Jun. 29, 2022 from US Patent and Trademark Office Re. U.S. Appl. No. 17/322,966. (7 pages).
Screenshot Benutzeroberflaeche.
Baldwin "Bridging the Path to a Silicon Future", IMI 17th Annual Ink Jet Printing Conference, 28 P., Feb. 7, 2008.
Barberan "Auszug Auftragsbestaetigung Brohl Master Curing Primer", Barberan, 3 P., Nov. 15, 2018.
Barberan "Auszug Webseite Wellpappenmaschinentyp", Barberan, 1 P.
Barberan "Barberan Screenshots", Barberan, 4 P., 2020.
Barberan "BIJ-Inkjet Modular Digital Printing Systems", Barberan, 7 P., 2020.
Barberan "Catalogues", Barberan, 9 P., Mar. 31, 2020.
Barberan "First Barberan Jetmasters in Germany", Barberan, Machine Transaltion, Mar. 16, 2021.
Barberan "Jetmaster 360 Printing Software Manual", Barberan, 58 P., Dec. 5, 2017.
Barberan "Jetmaster 360", Barberan, English Translation and Design, 12 P., Sep. 6, 2021.
Barberan "Jetmaster Series A", Barberian, 1 P., 2020.
Barberan "Jetmaster Series Catalogue", Barberan, 1 P., 2020.
Barberan "Jetmaster Series Waveform Configuration File for Seiko RC1536 and 1024GS", Barberan, 1 P., Sep. 6, 2021.
Barberan "Screenshot User Interface", Barberan, 1 P.
Barberan. "Single Pass Jetmaster Series", Barbera, 5 P., 2020.
Boards of Appeal of the EPO "Beschwerdekammer/Communication of the Board of Appeal Jun. 19, 2019", Complaint file No. T0665/15-3.2.05.
Boards of Appeal of the European Patent Office "Opinion Board of Appeal", Boards of Appeal of the European Patent Office, English Translation, 22 P., Jun. 19, 2019.
Dennis van Ijzerloo "Digital Printing Singlepass", DIPA Symposium, English Translation , 35 P., Aug. 7, 2019.
Dreiss Patentanw?lte PartG mbB "Action for Annulament of the DE Part of EP 2313281", Dreiss Patentanw?lte PartG mbB, English Translation, 72 P., Oct. 2020.
Dreiss Patentanwälte PartG mbB "Action for annulment of the DE part of EP 2 313 281.Reference number of the action for annulment: 3 Ni 34/20 (EP)", DREISS Patentanwälte PartG mbB, English Translation, 36 P., Jul. 19, 2021.
Düsseldorf Regional Court "Urteil/Judgemenet" Düsseldorf Regional Court, Nov. 25, 2021-12:20 0211 87565 1260 Regional Court Duesseldorf 3. 3/82, Nov. 25, 2021.
Eladio Jesús "Histogram Tool Description", Barberan, 4 P., Jun. 1, 2021.
Epson "Variable Sized Droplet Technology", Epson, 3 P., 2022.
European Standard "Chipboard Definition and classification German version EN 309", European Standard, English Translation, 11 P., Aug. 1992.
Federal Patent Court "Nichtigkeitsklage gegen den DE-Teil des EP 2 313 281 Aktenzeichen der Nichtigkeitsklage: 3 Ni 34/20 (EP) or Action for annulment of the DE part of EP 2 313 281 Reference number of the action for annulment: 3 Ni 34/20 (EP), in response to the defendant's statement of opposition of Apr. 9, 2021", Jul. 19, 2021.
Finsa "Catalogue", Finsa, 11 P., Mar. 4, 2022.
Finsa "Data Sheet MDF-Board", Finsa, 4 P., 2008.
Global Graphics "Global Graphics News Release ", Global Graphics, 3 P., Jul. 10, 2018.
Global Graphics "How to Mitigate Artifacts in High-Speed Inkjet Printing: a White Paper 4th Edition", Global Graphics, 16 P., Sep. 2019.
Jet Master Series "Barinsa—Waveform Report", Jet Master Series, 14 P., Sep. 2020.
Kruss "Client Application Report", Kruss, 12 P., Oct. 20, 2020.
Kruss "Determination of Droplet Sizes with DSAInkjet", Kruss, 4 P., Oct. 20, 2020.
Laminat Magazin "Himmen Prospect", Laminat Magazin, 2 P., 2009.

(56) References Cited

OTHER PUBLICATIONS

Li&Co AG "Micodur, Li&Co AG Confirmation of Purchase", Li&Co AG, 2 P., Sep. 8, 2021.
Lintec "Lintec Adhesives and Bonding", Lintec. 2 P., Mar. 2020.
Lintec "Lintec Product Information", Lintec, 4 P., 2020.
Meteor "MetCal for Print Calibration & Nozzle-Out Compensation", Meteor, 2 P., 2022.
Mimura et al. "Micro-Piezoelectric Head Technology of Color Inkjet Printer", International Conference on Digital Production Printing and Industrial Applications, 230-234 P., 2001.
Oji Tac Co.,Ltd. "OJI TAC", product information, Oji Tac Co.,Ltd., retrieved from the internet on Feb. 25, 2022.
PrintFlat "Corrects Inkjet Non-Uniformity Across the Web", PrintFlat, 7 P., Sep. 29, 2021.
Printing Industries of America "2019 Intertech Technology Award", Printing Industries of America, 34 P., 2019.
Seiko "508GS Greyscale Series of Printheads", Seiko, 2 P., Sep. 18, 2020.
Seiko "Seiko, 508GS Greyscale Series of Printheads, 2020", Seiko Holdings Group, Sep. 18, 2020.
SII Printek Inc. "Product Lineup—Inkjet Print Head—SII Printek Inc." retrieved from the internet on Mar. 8, 2021.
Toshiba "Brochure of CA3", Toshiba, 2 P., Jan. 12, 2022.
Toyo Ink Europe Specialty Chemicals D26 LIOJET UH021-YL-A10, Safety Data Sheet, Toyo ink Europe Specialty Chemicals, Jan. 3, 2017.
Wallace et al. "Photo Realistic Tnk Jet Printing ThroughDynamic Spot Size Control", Microfab, 9 P., Jun. 26, 2008.
Wikipedia "Archimedes Theorem about Sphere and Circular Cylinder", Wikipedia, English Translation, 7 P., Mar. 16, 2021.
Wikipedia "Corrugated Fiberboard", Wikipedia, 9 P., 2022.
Wlkipedia "Haftone", Wikipedia, 9 P., Retrieved from the Internet on Oct. 4, 2021.
Wikipedia "Holz", Wikipedia, retrieved from the internet on Apr. 8, 2021.
Wikipedia "Lintec", Wikipedia, English Translation, 3 P., Feb. 25, 2022.
Wikipedia "Medium-density fibreboard", Wikipedia, retrived from the internet on Jul. 4, 2022.
Wikipedia "Melamine Resin", Wikipedia, retrieved from the internet on Jul. 7, 2022.
Wikipedia "Melaniinharz", Wikipedia, retrieved from the internet on Mar. 2, 2022.
Wikipedia "Mitteldichte-Holzfaserplatte", Wikipedia, retrieved from the internet on Mar. 3, 2022.
Wikipedia "Paper", Wikipedia, retrieved from the internet on Jun. 24, 2022.
Wikipedia "Papier", Wikipedia, retrieved from the internet on Apr. 8, 2021.
Wikipedia "Satz des Archimedes ⊐ ber Kugel und Kreiszylinder" with machine-translation, Wikipedia, retrived from the internet on Mar. 16, 2021.
Wikipedia "Syntetic Paper", Wikipedia, retrieved from the internet on Feb. 25, 2022.
Wikipedia "Wellpappe, Wikipedia", retrieved from the internet on Apr. 8, 2021.
Wikipedia "Wood, Wikipedia", retrieved from the internet on Jun. 24, 2022.
Wikipedia "Yupo (manufacturer)", Wikipedia, retrieved from the internet on Feb. 25, 2022.
Xaar "Operating Parameters for XAAR 1001", Xaar, 7 P., 2008.
Xaar "Press Release Ligna 2009", XAAR, 6 P., May 18-22, 2009.
Xaar "User Manual(Handbuch) XAAR 1001", Xaar, 67 P., 2007.
Xaar—Technologies "The Wayback Machine", Xaar—Technologies, retrieved from the internet on Jun. 9, 2021.
Xaar Technology "Prospekt XAAR 1001", Xaar Technology.
Third Party IDS Submission under 37 CFR 1.290 filed on Aug. 3, 2022 From the US Patent and Trademark Office Re. U.S. Appl. No. 17/467,316.(2 Pages).
USPTO Communication dated Aug. 8, 2022 RE Third-Party Submission From the US Patent and Trademark Office Re. U.S. Appl. No. 17/467,316.(2 Pages).
Notice of Allowance dated Oct. 3, 2022 from US Patent and Trademark Office Re. U.S. Appl. No. 16/758,056. (38 pages).
Official Action dated Aug. 27, 2020 from the US Patent and Trademark Office Re. U.S. Appl. No. 16/494,307. (26 pages).
Barniz Entry in the Online Dictionary of the Spanish Language of the Real Academia, 3.P., Jun. 10, 2020.
Emmler "Neue Entwicklungen bei der Industriellen Beschichtung von Holz und Holzwerkstoffen fuer Innenanwendungen", Technische Universitaet Dresden, Fakultaet Maschinenwese, Institut fuer Holz-und Papiertechnik, Tagungsband des 14. Holztechnologischen Kolloquiums, Dresden, Germany, Apr. 8-9, 2010, Schriftenreihe Holz-und Papiertechnik, 5: 120-125, Apr. 8, 2010.
Von Aufschnaiter "Industrial Ceramic Tile Manufacturing", Durst Phototechnik, Slideshow, p. 1-18, Nov. 3, 2014.
Notice of Allowance dated Jun. 7, 2022 from US Patent and Trademark Office Re. U.S. Appl. No. 16/865,355. (9 pages).
Official Action with Third-Party Submission dated Sep. 10, 2021 From the US Patent and Trademark Office Re. U.S. Appl. No. 16/494,308. (50 Pages).
Official Action dated Oct. 18, 2021 from the US Patent and Trademark Office Re. U.S. Appl. No. 16/865,355. (56 pages).
Official Action dated Oct. 13, 2022 from the US Patent and Trademark Office Re. U.S. Appl. No. 16/865,356. (65 pages).
Final Official Action dated Feb. 7, 2022 from US Patent and Trademark Office Re. U.S. Appl. No. 16/494,308. (17 pages).
Third Party IDS Submission under 37 CFR 1.290 filed on Aug. 15, 2022 From the US Patent and Trademark Office Re. U.S. Appl. No. 17/322,966.(2 Pages).
USPTO Communication dated Aug. 17, 2022 RE Third-Party Submission From the US Patent and Trademark Office Re. U.S. Appl. No. 17/322,966.(2 Pages).
Restriction Official Action dated Apr. 26, 2021 from the US Patent and Trademark Office Re. U.S. Appl. No. 16/494,308. (6 pages).
Restriction Official Action dated Jul. 7, 2021 from the US Patent and Trademark Office Re. U.S. Appl. No. 16/865,355. (6 pages).
Final Official Action dated Mar. 18, 2022 from US Patent and Trademark Office Re. U.S. Appl. No. 16/865,355. (24 pages).
Notice of Allowance Mar. 15, 2023 from the US Patent and Trademark Office Re. U.S. Appl. No. 17/883,623. (15 pages).
Notice of Allowance Mar. 16, 2023 from the US Patent and Trademark Office Re. U.S. Appl. No. 17/883,626. (12 pages).
Official Action dated Mar. 9, 2023 from the US Patent and Trademark Office Re. U.S. Appl. No. 17/467,316. (72 pages).
Official Action dated Dec. 5, 2022 from the US Patent and Trademark Office Re. U.S. Appl. No. 17/883,623. (59 pages).
Official Action dated Dec. 5, 2022 from the US Patent and Trademark Office Re. U.S. Appl. No. 17/883,626. (62 pages).
Official Action dated Apr. 5, 2023 from the US Patent and Trademark Office Re. U.S. Appl. No. 16/865,356. (18 pages).
Wijshoff "The Dynamics of the Piezo Inkjet Printhead Operation", Physics Report, 491(4-5): 77-177, Available Online Mar. 31, 2010.
Restriction Official Action dated Apr. 26, 2023 from the US Patent and Trademark Office Re. U.S. Appl. No. 18/092,347. (6 pages).
Notice of Allowance dated Apr. 20, 2022 from US Patent and Trademark Office Re. U.S. Appl. No. 16/494,309. (16 pages).
Notice of Allowance dated Apr. 21, 2022 from US Patent and Trademark Office Re. U.S. Appl. No. 16/494,308. (16 pages).
European Search Report and the European Search Opinion dated Jun. 20, 2023 From the European Patent Office Re. Application No. 23159373.2. (17 Pages).
Advisory Action dated Jul. 26, 2023 from the US Patent and Trademark Office Re. U.S. Appl. No. 16/865,356. (6 pages).
Official Action dated Jul. 14, 2023 from the US Patent and Trademark Office Re. U.S. Appl. No. 17/322,966. (100 pages).
Official Action dated Jul. 25, 2023 from the US Patent and Trademark Office Re. U.S. Appl. No. 18/092,347. (43 pages).
Official Action dated Aug. 9, 2023 from the US Patent and Trademark Office Re. U.S. Appl. No. 17/467,316. (45 pages).

(56) References Cited

OTHER PUBLICATIONS

Restriction Official Action dated Aug. 8, 2023 from the US Patent and Trademark Office Re. U.S. Appl. No. 16/865,358. (7 pages).

* cited by examiner
† cited by third party

METHOD FOR PRODUCING A STRUCTURED SURFACE

RELATED APPLICATIONS

This application is a National Phase of PCT Patent Application No. PCT/EP2018/065738 having International filing date of Jun. 13, 2018, which claims the benefit of priority of German Patent Application Nos. 10 2017 113 035.7 and 10 2017 113 036.5, both filed on Jun. 13, 2017, and European Patent Application Nos. 18157511.9 filed on Feb. 19, 2018, 18161725.9 filed on Mar. 14, 2018, 18162382.8 filed on Mar. 16, 2018 and 18168263.4 filed on Apr. 19, 2018. The contents of the above applications are all incorporated by reference as if fully set forth herein in their entirety.

FIELD AND BACKGROUND OF THE INVENTION

The present invention concerns a method and an apparatus for producing a decorative surface, in particular on a workpiece.

The aim of all decorative surfaces or decorative coated surfaces is to look as lifelike as possible. To achieve this, for example particle boards, MDF boards, HDF boards, plastic boards or even external facades, e.g. metal sheets or plastic sandwich constructions and similar boards with a reproduction of a natural material, e.g. wood, stone, are then provided with a three-dimensional embossed structure (haptics) according to the state of the art.

This haptic is often applied synchronously to the underlying decorative image. This means that in a wood reproduction, e.g. a printed knot hole, is covered with a depression provided in the embossed structure above, while higher areas from the wood look do not receive an embossed depression.

Such a structure is also called a synchronous pore. This synchronous pore can be produced by analog means using an embossing matrice matched to a decorative image, which is placed in a press with decor accuracy, e.g. in a cycle press or a continuous double-belt press (see DE 103 16 695 B4).

Patent EP 3 109 056 B1 shows a method in which such a synchronous structure can be applied very flexibly to a lacquer layer according to a digital template.

In all these methods it is very desirable not only to be able to feel the decorative and printed image as well as the structure (haptics), but also to visually recognize it. This means that a difference in gloss level between the deeper areas (pores) and the higher areas is desired for three-dimensional structuring. The gloss level is determined here in accordance with the method according to DIN EN ISO 2813:2015-02. For gloss measurement, a quantity of light is measured that is reflected from a surface in relation to a reference standard of polished glass. The unit of measurement used is GU (Gloss Units). The amount of light reflected by the surface depends on the angle of incidence and the properties of the surface. For gloss measurement, different angles of incidence (20°, 60° and 85°) can be used to measure the reflectance, preferably with an angle of incidence of 60°. Alternatively, the mean value of measurements for the three angles of incidence can also be used. The reflectance compares the light energy emitted and received by a gloss meter in percent at a certain angle of incidence.

All surfaces or parts of surfaces which, according to the standard, achieve less than 20 gloss units when measured with a gloss meter are defined as "matte" and all surfaces or sections of surfaces which achieve more than 60 gloss units are defined as "glossy". One of the two lacquer layers can be matte and the other one glossy.

In order to achieve such a difference in gloss units between the glossy areas and the less glossy areas of e.g. 20 gloss units difference, preferably less than 10 gloss units difference, with the digital process, it is known to work with different digitally applied lacquers and thus produced different gloss levels. However, this process is very time-consuming, as different lacquers have to be used.

Furthermore, the change in the gloss level of an at least not completely cured, especially liquid, layer of a not yet polymerized plastic, which is activated to polymerize by irradiation with high-energy electromagnetic radiation with a wavelength of less than 300 nm, preferably less than 250 nm, is known from the state of the art. Due to the polymerization only in the upper layer of this liquid layer, which was applied e.g. with a layer thickness of 50 μm (polymerization only takes place in a layer of less than 0.1 μm, preferably less than 0.01 μm), the polymerization of this thin layer results in a quasi "skin" on the still liquid layer below. As a result, this skin shows wrinkling in the micro or nano range, which ultimately causes the matting of this surface, since, compared to an untreated layer, it increasingly diffuses incident light in several spatial directions.

This process is known from the product range of "Innovative Oberflachentechnologien GmbH", for example.

With this matting process, however, the resulting surface is evenly matted and has the same gloss level or mattness at all lower and higher areas. Especially with wood reproductions with a very low gloss level (very deep matt) of e.g. less than 5, preferably less than 3 gloss units, the previously applied structure depths of e.g. 10 to 50 μm height difference between the deeper pores and the elevated areas can no longer be visually detected.

SUMMARY OF THE INVENTION

It is therefore the objective of the present invention to develop a method and apparatus with which a decorative surface can be produced very flexibly without including the disadvantages of the different lacquers required.

This problem is solved by the independent claims. Advantageous embodiments are the subject of the sub-claims.

In order to be able to produce these gloss differences and at the same time to influence the gloss level due to the microfolding described above using high-energy electromagnetic radiation with a wavelength of less than 200 nm, the method according to the invention proposes the following procedure:

According to the invention, a method for producing a decorative surface on a workpiece is provided comprising the following steps:

- Feeding of the workpiece, which is coated with a liquid layer, to a digital printing station;
- Applying of an agent capable of at least partially absorbing electromagnetic radiation, at least on a partial surface of the surface of the liquid layer, or which, in contact with the surface, produces a reaction product which is adapted to at least partially absorbing electromagnetic radiation;
- Irradiation of the surface of the liquid layer and the agent with electromagnetic radiation having a wavelength of less than 300 nm, preferably less than 250 nm, particularly preferably less than 200 nm;

In order to make the method flexible, electromagnetic radiation of different wavelengths in different time intervals is preferably used. Preferably a wavelength of less than 200 nm is used first, then a wavelength of less than 250 nm and finally a wavelength of less than 300 nm.

Preferably, the agent is sprayed onto the liquid layer in the form of fine droplets and/or applied in the form of droplets, in particular by means of a digital print head or a digital nozzle bar.

The chemical and/or physical properties of the agent are preferably suitable for absorbing at least 10%, preferably at least 30%, especially preferably at least 50%, of incident electromagnetic radiation.

The higher the absorption capacity of the agent, the less of it has to be applied to the liquid layer to achieve the same absorption effect. A good absorption capacity thus enables an economic operation of the method.

In this application, the fine droplets preferably form an even layer on the surface of the liquid layer when applied, whereby they are particularly suitable for application over a larger area.

The fine droplets have in particular a volume of 0.1 μl to 1 μl, preferably 0.3 μl to 0.8 μl, especially preferably 0.5 to 0.6 μl.

The droplets have in particular a volume from 1 μl to 80 μl, preferably from 3 μl to 12 μl, especially preferably from 5 μl to 10 μl.

The speed of the droplets and/or the fine droplets is especially between 0.5 m/s and 12 m/s, preferably between 3 m/s and 7 m/s, especially preferably between 5 m/s and 6 m/s.

In an embodiment, the surface of a liquid layer on a workpiece is thus sprayed with droplets of an agent in the form of a liquid which is capable of at least partially absorbing the high-energy electromagnetic radiation before the still liquid lacquer layer is irradiated with the high-energy electro-magnetic radiation having a wavelength of less than 200 nm. This ensures that the polymerization in the surface of the underlying layer and droplets in the areas where the surface has been sprayed with the droplets does not polymerize or polymerizes much less and the mattness is therefore different, preferably lower, than in the areas not sprayed with the droplets.

Preferably, the droplets and/or the fine droplets are dispensed in such a way that they at least partially penetrate the surface of the liquid layer upon impact, and/or come to rest and/or displace it and introduce depressions, whereby the droplets are in particular adapted in volume and/or speed in order to influence the penetration depth and the displacement.

The discharge of the fine droplets is preferably controlled in such a way that their impulse upon impact on the surface of the liquid layer is insufficient to at least partially overcome the surface tension and/or the viscosity forces of the liquid layer, so that the fine droplets preferably come to rest on the surface of the liquid layer.

The discharge of the droplets is preferably controlled in such a way that their impulse upon impact on the surface of the liquid layer is sufficient to at least partially overcome the surface tension and/or the viscosity forces of the liquid layer, so that the liquid layer is displaced by the droplets, whereby a structure of 10 to 50 μm height difference can be introduced into the liquid layer.

By irradiating the surface of the liquid layer with the electromagnetic radiation, having a wavelength of less than 300 nm, preferably less than 250 nm, especially preferably less than 200 nm, a microstructure or nanostructure is preferably formed in the surface of the uppermost partial surface of the liquid layer by microfolding, which scatters the reflection of incident light and thus creates an optically matte-looking appearance. The microfolding of the uppermost partial surface of the liquid layer is caused by polymerization of the liquid layer as described above.

In order to allow the execution of this method, the liquid layer consists preferably of a polymerizable acrylate mixture. It also preferably has radiation-curing properties.

The liquid layer can alternatively be formed as an aqueous or solvent-based lacquer system, which can be dried, for example, by means of a nozzle dryer.

In a specific embodiment, the liquid layer consists of an acrylic lacquer containing 30% by weight of a HDDA bi-acrylate, 40% by weight of a DPGDA bi-acrylate, 10% by weight of a TM PTA crosslinker, 3% by weight of an industrial photoinitiator and 17% by weight of other components. The acrylic lacquer has a viscosity of 80-500 mPas, preferably 150-400 mPas, measured at 25° C. and normal pressure with a rheometer.

Furthermore, the agent applied preferably consists of a polymerizable acrylate mixture and/or of a solvent-containing liquid and/or of an aqueous mixture, in particular with a water content of more than 30%, preferably more than 50%.

Preferably, the layer is cured by irradiation with electromagnetic radiation, having a wavelength preferably greater than 250 nm, especially preferably greater than 300 nm, and/or by irradiation with electron radiation and/or by active and/or passive drying.

Active drying means any type of drying in which the liquid layer is dried by providing special conditions. For example, the liquid layer can be dried, in particular by inflowing a fluid, in particular air, and/or by supplying heat, in particular by means of IR radiation or by using a heater.

Passive drying, on the other hand, is preferably characterized in that the liquid layer hardens alone and without further processing. This can be done, for example, by transporting the workpiece along a free section of a conveyor belt and/or by depositing the workpiece.

Preferably, curing is carried out by reaction curing, for example using a two-component system, which cures by chemical reaction between the components within less than 30 minutes, preferably less than 5 minutes.

Preferably, the applied agent consists only of water, or it contains at least one of the following ingredients in the indicated concentration (vol %) in addition to water having a total content of 10-99%:

- a substance from the group of hindered amines in a concentration of 0-20%
- a substance from the group of N,N'-diphenyleoxamides in a concentration of 0-20%.

In addition to an alcohol and/or a glycol having a total content (alcohol and/or glycol) of 10-99%, the applied agent preferably contains at least one of the following ingredients in the indicated concentration (vol %):

- a substance from the group of hindered amines in a concentration of 0-20%
- a substance from the group of N,N'-diphenyleoxamides in a concentration of 0-20%.

In addition to a polymer content of 10-99%, the applied agent preferably contains at least one of the following ingredients in the indicated concentration (vol %):

- a substance from the group of benzophenones in a concentration of 0-15%
- a substance from the group of benzotrialzoles in a concentration of 0-15%.

Furthermore, the agent applied is preferably adapted such that it evaporates within less than 3 minutes, preferably within less than 1 minute, particularly preferably within less than half a minute, especially after irradiation with electromagnetic radiation, especially of less than 300 nm, preferably of less than 250 nm, especially preferably of less than 200 nm.

The faster the agent evaporates from the surface of the liquid layer after application or after the irradiation mentioned above, the faster it can be changed to the next processing step, which brings advantages in cycle time or production speed.

A further step in the method is particularly preferred, in which the evaporation of the agent is carried out within less than 3 minutes, preferably within less than 1 minute, especially preferably within less than half a minute.

Such an evaporation step may in particular be adapted so that the workpiece is conveyed with the applied agent on the liquid layer through an appropriately arranged section which provides special evaporation conditions for the agent.

Evaporation of the agent can take place in particular actively, whereby the agent is evaporated by providing special conditions. This means that the agent can be evaporated, in particular with an inflow of a fluid, in particular with air, and/or by supplying heat, in particular by means of IR radiation or by using a heater.

Alternatively or additionally, the agent can also evaporate alone and without further processing. This can be done, for example, by transporting the workpiece on a free section of a belt conveyor and/or by storing the workpiece, whereby further processing takes place after evaporation.

Preferably, the agent undergoes a chemical reaction when it hits the surface or when it comes into contact with the surface of the liquid layer in such a way that there is an optical and/or haptic change in the surface at the respective area.

This can preferably be done by polymerizing the surface of the liquid layer together with the agent, which polymerization is triggered and/or enhanced in particular by irradiation with electromagnetic radiation. For example, polymer formation changes the reflective properties of the surface of the liquid layer and/or its roughness.

A chemical reaction step is particularly preferred, which is adapted in such a way that the chemical reaction between the agent and the layer is given sufficient time for this chemical reaction to at least partially take place.

Such a chemical reaction step may in particular be adapted in such a way that the workpiece is conveyed with the agent applied to the liquid layer through a correspondingly set up section which has special reaction conditions for the agent and the liquid layer.

This can be achieved, for example, by supplying heat, in particular by means of IR radiation or by using a heater.

Preferably, the chemical reaction is adapted in such a way that a reaction product is formed when the agent hits the liquid layer or when it comes into contact with the liquid layer, which reaction product has an absorption property with respect to electromagnetic radiation.

Preferably, the applied agent also undergoes a chemical reaction with the layer upon impact such that, by irradiation with electromagnetic radiation having a wavelength of less than 300 nm, preferably less than 250 nm, particularly preferably less than 200 nm, the reaction product achieves no or less microstructure formation at these areas than on the areas on which no agent has been applied to the surface.

Preferably, a further step is also envisaged in which the liquid layer is applied to a surface of the workpiece.

This can be done, for example, by roller application, in which the surface of the workpiece is coated over the entire area, or over partial areas to be structured, with the liquid layer. Alternatively, the application can also be carried out by means of a spray head, which applies the liquid layer to the surface of the workpiece by means of nozzles.

Preferably, a further step, especially for simultaneous application of the agent, is part of the method in which the liquid layer is structured by means of an analog or digital structuring method, whereby in particular a structure of the liquid layer with a height difference of 10 to 50 μm is achieved.

Preferably, a further step is also envisaged in which the liquid layer is structured by means of an analog structuring method, in particular with an embossing roller or an embossing plate, and/or is displaced by structuring droplets using analog or digital application, in particular by means of a digital print head, wherein depressions are introduced into the layer by the structuring.

The structuring droplets have in particular a volume from 1 μl to 80 μl, preferably from 3 μl to 12 μl, especially preferably from 5 μl to 10 μl.

The speed of the structuring droplets is particularly between 1 m/s and 12 m/s, preferably between 3 m/s and 7 m/s, especially preferably between 5 m/s and 6 m/s.

The structuring droplets preferably consist of the same material as the liquid layer, so that their impact on the liquid layer only causes a physical displacement to structure the liquid layer.

Alternatively or additionally, structuring droplets can be applied which differ in their composition, in particular in their density from the liquid layer. It is also conceivable that these structuring droplets are capable of reacting chemically with the surface of the liquid layer in order to achieve an optical and/or haptic change in this surface.

Furthermore, it is conceivable that the structuring of the liquid layer is carried out in such a way that this structure is as synchronous as possible (i.e. with a maximum deviation of 2 mm, preferably 1 mm) relative to a decorative image applied to the workpiece below the liquid layer. This means that if a wood grain is shown on the workpiece, the structure also reproduces a wood grain that corresponds to the grain of the decorative image. The layer is then at least partially transparent, preferably at the latest after curing, so that the decorative image becomes visible.

Preferably, a further step can also be provided in which, for example, a decorative image is applied to the workpiece by means of digital printing. Alternatively, a decorative image can also be applied to a structured layer which is at least partially cured or which has a surface hardened by polymerization. This decorative image can be designed in one or more colors.

The method steps described here are not to be understood as being limited to the subject matter of the method according to the invention. Rather, further methods can be obtained by exchanging, repeating or omitting individual steps. For example, after the first coating with a liquid layer, a further coating with a liquid layer can also be carried out, which coating is also matted in order to achieve special optical effects.

According to the invention, an apparatus suitable for carrying out the method according to the invention is also provided, the apparatus comprising the following elements:

- a transport device having a main transport direction, wherein the transport device is adapted to transport a workpiece coated with a liquid layer to further elements of the apparatus,
- a dispenser adapted to apply an agent to at least a partial area of the surface of the liquid layer;

a radiation source adapted to irradiate the surface of the liquid layer with electromagnetic radiation having a wavelength of less than 300 nm, preferably less than 250 nm, particularly preferably less than 200 nm.

Preferably, the apparatus comprises a curing station, which can be differently shaped in order to realize a curing of the at least partially liquid layer.

For this purpose, a radiation source may preferably be provided which is adapted to irradiate the liquid layer and/or the applied agent with electromagnetic radiation of variable wavelength, in particular with IR radiation, at least until its partial curing.

The radiation source is preferably provided separately and/or identical with the radiation source which emits the electromagnetic radiation with a wavelength of less than 300 nm, preferably less than 250 nm, particularly preferably less than 200 nm.

Alternatively or additionally, the radiation source can emit electron radiation of variable wavelength.

Furthermore, the curing station preferably comprises a fluid source which is adapted to flow in particular air around the layer, wherein the fluid can be influenced in particular in the parameters flow speed and/or temperature and/or humidity.

Furthermore, the curing station preferably comprises an electron beam source which is adapted to irradiate the liquid layer and/or the applied agent with electron radiation at least until it has partially cured.

Furthermore, the curing station preferably comprises a drying station which is adapted to receive the workpiece until at least partial curing of the layer and to provide a predetermined drying temperature, in particular by means of a heat source, to which drying temperature the workpiece with the layer can be exposed.

Preferably, the apparatus also comprises control means adapted to control the apparatus in accordance with the method steps. This may, for example, be an electronically controlled control unit, in particular a control unit adapted to transmit electronic control signals to the other elements of the apparatus and preferably to receive signals from the other elements of the apparatus. In this way, for example, feedback on the amount of droplets presently dispensed or their speed and other information relating to the method can be transmitted to the control unit, so that it receives information on the current execution of the method and can provide appropriately adapted control signals.

The apparatus also preferably comprises a reaction zone which is adapted to enable evaporation and/or a chemical reaction, wherein the reaction zone is adapted in particular as a region through which the transport device transports the workpiece, and its expansion and the transport speed are matched to each other in such a way that evaporation and/or reaction are at least partially possible. For example, this can be a chamber through which the workpiece, which can also be sheet-like, is transported.

The apparatus also preferably comprises a protective gas chamber which is adapted to surround the workpiece and/or the layer and/or the agent with a protective gas, in particular an inert gas, preferably nitrogen, on at least a partial section during transport. This makes it possible to create an atmosphere that does not influence a chemical reaction of the layer with the agent or polymerization by electromagnetic radiation.

Preferably, the apparatus also comprises an application device adapted to apply the liquid layer to the workpiece. This application device comprises in particular a rolling mill which is adapted to coat the workpiece with a liquid layer. Alternatively or additionally, a spray head can be provided, which applies the liquid layer to the surface of the workpiece by means of nozzles.

Preferably, the apparatus also comprises a structuring element adapted to introduce a structure into the liquid layer. This can preferably be an analogue embossing roller or an embossing plate, on which a structure is provided by means of elevations, which can be transferred to the liquid layer by pressing it into place. Alternatively or additionally, the structuring element comprises at least one digital print head which is adapted to apply structuring droplets onto the liquid layer. The digital print head is preferably adapted to enable adjustment of the impulse and/or volume and/or speed of the structuring droplets in such a way that the structuring droplets achieve a structuring effect upon impact on the liquid layer, in particular by displacing the liquid layer.

Preferably, the apparatus also comprises an application device for applying a decor image, with at least one digital print head adapted to apply ink to the surface of the layer and/or the workpiece. This makes it possible to apply a decorative image to the surface of the workpiece and/or the layer.

Preferably, the transport device has a conveyor belt, whereby the elements of the device described above are arranged one after the other in the main transport direction. In particular, a processing sequence of the method steps can be defined by the sequence of arrangement.

Preferably, the dispenser comprises at least one digital print head adapted to dispense the agent. The digital print head is preferably adapted in such a way that it can release the agent either in the form of fine droplets or droplets onto the surface of the liquid layer. It is also preferably capable of dosing the volume, speed and/or impulse of the fine droplets and/or droplets according to a specification, for example from the control means.

Preferably, the reaction zone has special boundary conditions that are necessary to trigger evaporation and/or a chemical reaction.

Preferably, the reaction zone extends over at least part of the protective gas chamber. In this way, it is advantageously achieved that the reaction takes place at least partially under protective gas, so that the influence of unwanted chemical components, in particular the ambient air, is minimized.

The elements of the apparatus described here are not limited to the subject-matter of the apparatus according to the invention. Rather, further apparatuses can be obtained by exchanging, multiplying or omitting individual elements. For example, after the first coating and matting with a liquid layer, another coating with a liquid layer can be applied, which is also matted to achieve special optical effects.

BRIEF DESCRIPTION OF THE SEVERAL VIEWS OF THE DRAWINGS

Furthermore, the description of concrete examples of the invention will be provided with the aid of the attached drawings.

Description of specific embodiments of the invention

Figure 1:
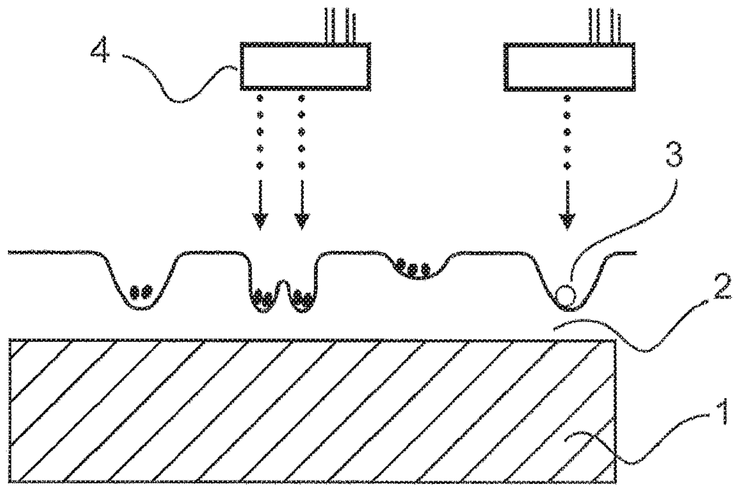
FIG. 1 shows a workpiece coated with a liquid layer on which an agent in the form of droplets is applied.

FIG. 1 shows a workpiece 1 with a liquid layer 2 applied to it and an agent sprayed onto layer 2 in the form of droplets 3 from digital print heads 4 arranged above. The workpiece 1 is moved from right to left in a transport direction under the print heads 4, so that the print heads 4 can apply the droplets 3 in different areas on the liquid layer 2.

The agent is capable of absorbing electromagnetic radiation at least partially. Thus it can be achieved that parts of the surface of the liquid layer 2, which are covered with the agent, can be at least partially shielded from the direct influence of electromagnetic radiation.

It can be seen that the droplets 3 produced depressions upon impact on the liquid layer 2, whereby the viscosity of the liquid layer 2 is such that these depressions do not immediately recede. Thus, by applying droplets 3, a structuring of the liquid layer 2 can be achieved for at least a certain period of less than 5 minutes, preferably less than 3 minutes, which can be permanently solidified by final curing.

Figure 2:
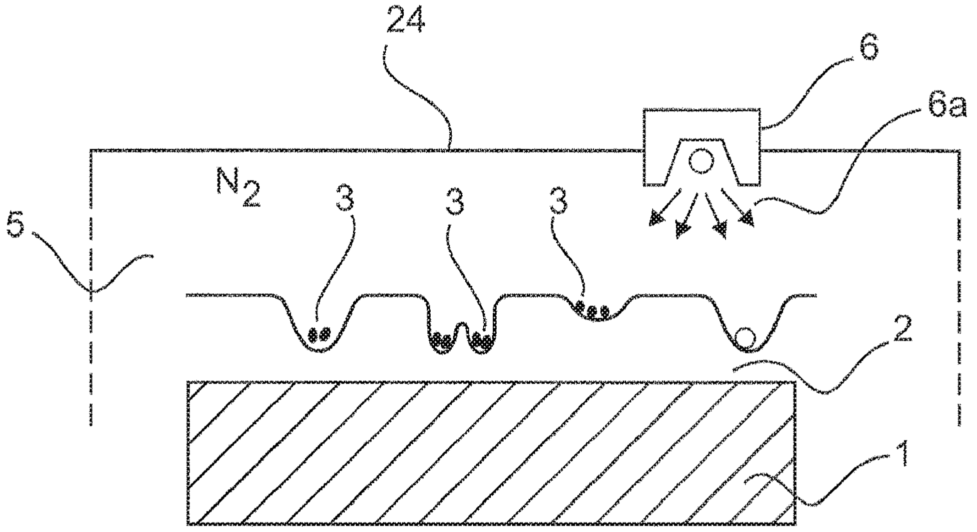
FIG. 2 shows the workpiece in a protective gas chamber in which it is irradiated with electromagnetic radiation by means of a lamp.

In FIG. 2 this workpiece 1 with the liquid layer 2 is in an inert gas chamber 24, which predominantly has a nitrogen atmosphere in the inside 5 in order to keep oxygen atoms or oxygen molecules away from the surface of the layer 2 in order to inhibit unwanted chemical reactions with oxygen of the air.

The surface of layer 2 here has a structure created by droplets 3 as shown in FIG. 1. The droplets 3 are still in the depressions.

Furthermore, a radiation source 6 for electromagnetic radiation 6*a* is provided, under which the workpiece 1 is moved with the liquid layer 2, which is structured by the depressions. The radiation source 6 is adapted to emit electromagnetic radiation 6*a* onto the surface of the liquid layer 2. For example, the electromagnetic radiation 6*a* has a wavelength of less than 300 nm, preferably less than 250 nm, especially preferably less than 200 nm.

Instead of nitrogen, another inert gas atmosphere may also be formed in the inside 5 of the protective gas chamber 24, which is suitable for keeping oxygen atoms and/or oxygen molecules away from the surface of layer 2.

The protective gas chamber 24 can be adapted as a closed space or as a section through which a workpiece 1 is moved. This is particularly advantageous for sheet-like workpieces 1.

Figure 3:
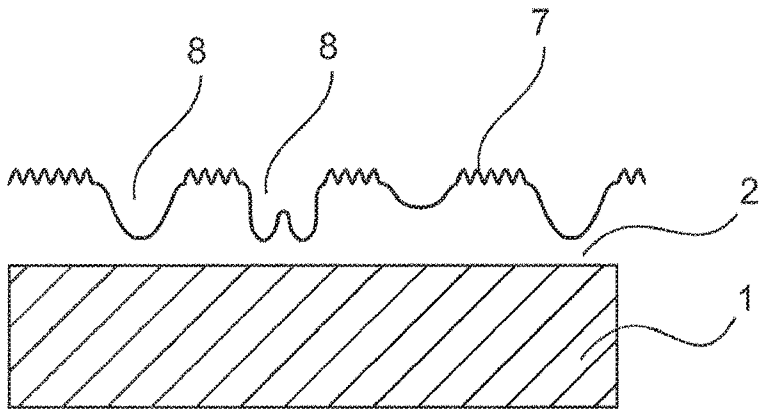
FIG. 3 shows the workpiece with different mattnesses of the applied layer.

FIG. 3 shows the liquid layer 2 on workpiece 1 after irradiation with electromagnetic radiation 6*a* from radiation source 6. The surface of the liquid layer 2 is more or less strongly polymerized in different areas.

At areas 7, the electromagnetic radiation 6*a* could unhindered impact the surface of layer 2, whereby a stronger polymerization took place here. The surface has become rougher at this area, at least in the micro or nano range, since the molecules of the liquid layer 2 near the surface have become more strongly cross-linked due to the electromagnetic radiation 6*a*. Therefore, light falling on these areas 7 is now reflected in several directions, i.e. in a diffuse manner, which results in a higher degree of mattness of these areas 7.

In contrast, the electromagnetic radiation 6*a* could not directly reach areas 8 of the surface of the liquid layer 2, as these were covered with the agent in the form of droplets 3, as shown in FIGS. 1 and 2. The agent is now no longer present on the surface of the liquid layer 2, as it has evaporated, for example.

However, the agent has at least partially absorbed the electromagnetic radiation at lower areas 8, so that a polymerization of the surface of the liquid layer 2 could not take place here to the same extent as at the areas 7, resulting in the lower areas 8 being less rough, at least in the micro- or nano range, whereby a reflection of incident light is scattered less strongly. Areas 8 therefore appear shinier than areas 7.

Figure 4:
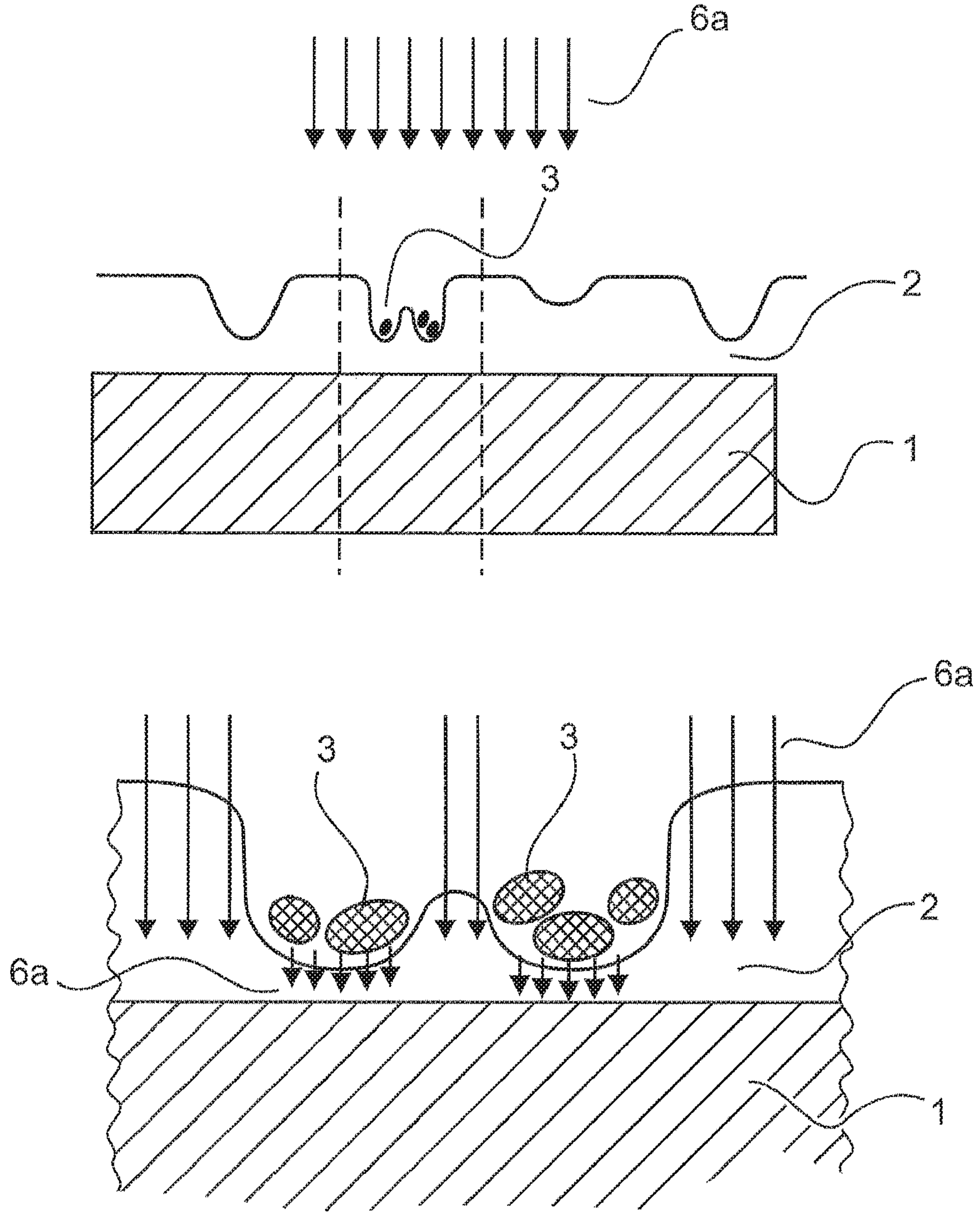
FIG. 4 shows the exposure of the liquid layer and the applied agent to electromagnetic radiation.

FIG. 4 shows in the lower drawing a section, which is marked in the upper drawing by the two vertical dashed lines, of the layer 2 on the workpiece 1 and the agent sprayed on it in the form of droplets 3, which at least partially absorb the electromagnetic radiation 6*a* in the areas of the droplets 3.

It can be seen that in areas not covered by droplets 3, electromagnetic radiation 6*a* can impact unhindered on the surface of the liquid layer 2. This is illustrated by the length of the arrows of the electromagnetic radiation 6*a*, which describe the intensity with which the surface of the liquid layer 2 is irradiated.

In contrast, the intensity of the electromagnetic radiation 6*a* on the surface of the liquid layer 2 in areas covered with droplets 3 is significantly lower, as can be seen from the comparatively short arrows of the electromagnetic radiation 6*a* below the droplets 3.

Figure 5:
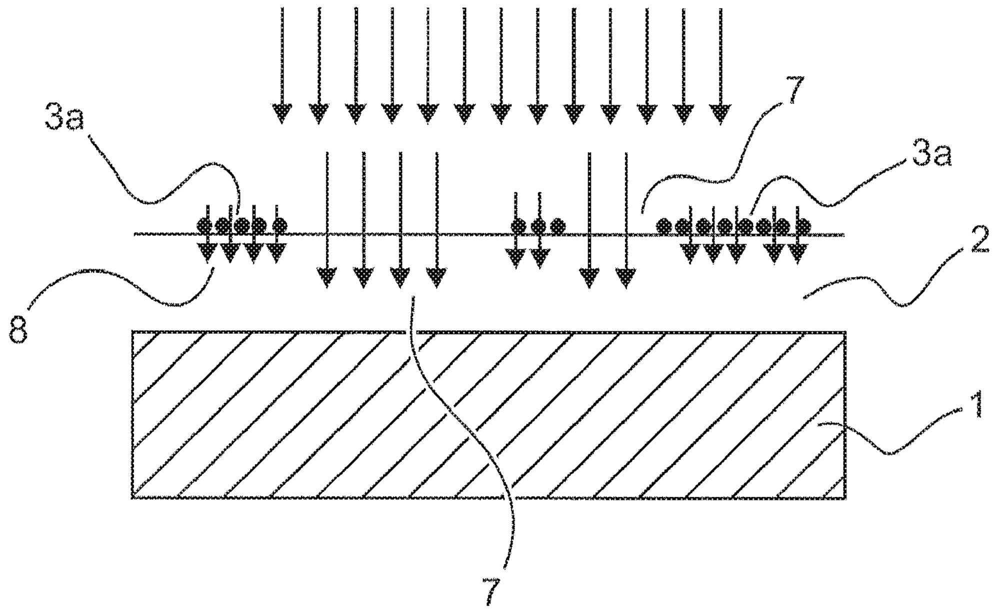
FIG. 5 shows another embodiment in which the agent was only applied to the surface of the liquid layer without changing its structure.

FIG. 5 shows another embodiment in which the agent was only applied to the surface of the liquid layer without changing its structure.

The agent is applied here in the form of fine droplets 3*a*, which have been applied to the liquid layer in such a way that they do not sink into the surface of the liquid layer 2 or displace it and cause depressions. This can be achieved, for example, by adjusting the volume and/or impact speed of the fine droplets 3*a* in such a way that the surface of the liquid layer is not altered by them.

An impulse of the fine droplets 3*a* can be adjusted so that it is not sufficient to break the surface tension of the liquid layer 2, so that the fine droplets 3*a* do not sink into the liquid layer 2, and/or that it is not sufficient to overcome the viscosity forces of the liquid layer 2, so that no depressions are introduced into the liquid layer 2 due to the fine droplets 3*a*.

It can also be seen that the fine droplets 3*a* are sized to form a fine veil on at least part of the surface of the liquid layer.

In this way it is possible to apply electromagnetic radiation 6*a* onto the surface of the liquid layer 2 in different areas to a different extent, as it penetrates less strongly into the surface of the liquid layer in areas containing the agent. This is shown, comparable to FIG. 4, by the different arrow lengths of the electromagnetic radiation 6*a*. Thus, the surface in areas 7, which are not covered with the fine droplets 3*a*, is irradiated with higher intensity than areas 8, which were at least partially shielded from the electromagnetic radiation 6*a* by the agent in the form of fine droplets 3*a* or a veil thereof.

Figure 6:
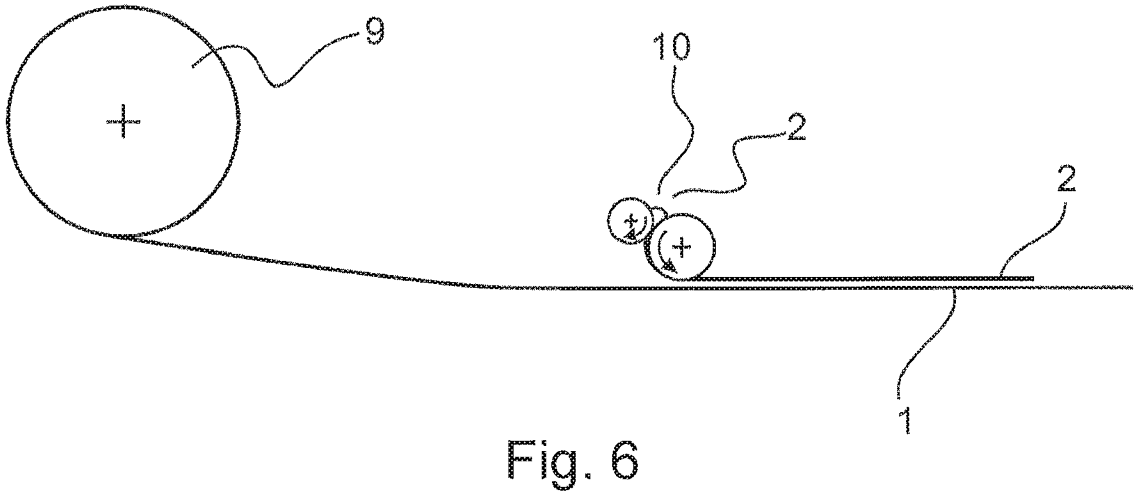
FIG. 6 shows an alternative workpiece as a sheet-like material.

FIG. 6 shows an alternative workpiece 1 as sheet-like material, which is unwound from a roll 9 and also coated with a liquid layer 2. Workpiece 1 moves continuously to the right, where further processing steps (not shown) as described above follow.

The liquid layer 2 is applied in this embodiment after unrolling from the roll 9 using a rolling mill 10. The matting method can thus be applied not only to individual flat workpieces, such as boards made for example of wood, plastic or metal, but also to sheet-like workpieces 1.

Figure 7:
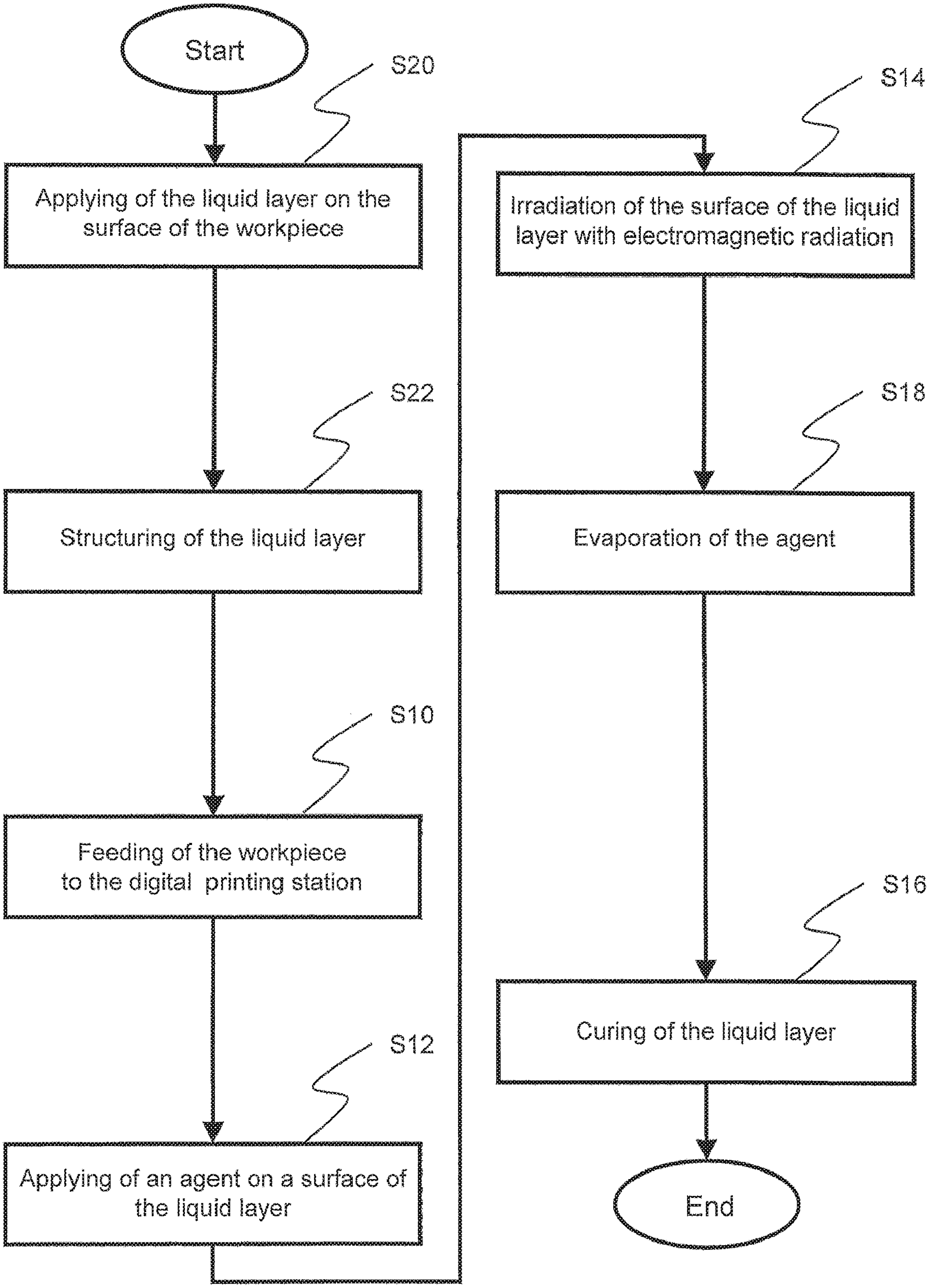
FIG. 7 is a flowchart of a preferred embodiment of the method according to the invention.

FIG. 7 shows a flowchart of a preferred embodiment of the method according to the invention.

In a first processing step, application S20 of a liquid layer onto the surface of a workpiece takes place. This can be done, for example, in the manner shown in FIG. 6.

Then structuring S22 of the thus coated workpiece takes place, so that the liquid layer is provided with a structure after completion of this step. For example, the liquid layer can be structured by an analogous structuring method, in particular by mechanically embossing the surface of the liquid layer, for example by unrolling an embossing roller over the surface of the liquid layer.

Alternatively or additionally the structuring of the liquid layer can also be done digitally, whereby for example droplets are applied to the surface of the liquid layer with digital print heads, which droplets penetrate and/or displace the liquid layer. The droplets are advantageously made of the same material as the liquid layer in order to achieve a structuring effect. In a different embodiment, the droplets may consist of a material other than the liquid layer, whereby, for example, a chemical reaction between the liquid layer and droplets can be achieved, in particular by subsequent irradiation with electromagnetic radiation and/or electron beam and/or temperature increase. The chemical reaction is adapted in such a way that its reaction product has a structuring effect on the surface of the liquid layer, which changes it optically and/or haptically.

If there is a decorative image on the workpiece, which was covered by the application S20 of the liquid, in particular partially transparent layer, then during the structuring of the surface it is achieved that the structure is synchronous to the image visible through the liquid layer.

The thus prepared workpiece is then fed to a digital printing station (S10), for example via a continuous belt conveyor.

In a further step S12, the digital printing station enables the application of an agent, which is capable of at least partially absorbing electromagnetic radiation, onto the surface of the liquid layer.

The application S12 of the agent can be carried out in the form of droplets which, for example, are adjusted in speed and volume in such a way that they can overcome the surface tension and/or the viscosity forces of the liquid layer in order to structure it. Alternatively or additionally, the agent can be applied S12 in the form of fine droplets, which are dimensioned in such a way that they do not change the surface of the liquid layer, but at least cover partial areas of it.

Subsequently, irradiation S14 of the surface of the liquid layer with high-energy electromagnetic radiation is performed as shown in FIGS. 2, 4 and 5, whereby partial areas of the liquid layer covered with the agent experience a reduced intensity of radiation compared to partial areas which are not covered by the agent and are directly exposed to radiation instead.

The irradiation S14 of the surface of the liquid layer leads to its polymerization to a certain penetration depth, for example 0.1 μm, preferably less than 0.01 μm, whereby the polymerization was stronger at the areas directly exposed to the radiation, as shown in FIG. 3. After completion of irradiation S14, these areas are therefore more matte than the areas covered with the agent.

Subsequently, the applied agent is evaporated in a further step S18. This can be done for example simply by heating the agent with an IR lamp, whereby the agent has advantageously a lower evaporation temperature than the liquid layer.

If, however, the agent has the property that it volatilizes after a certain time, the evaporation S18 can only consist of waiting until the agent has volatilized. This can be done, for example, by conveying the workpiece on a belt conveyor before the next method step is carried out, whereby this belt conveyor is configured in its length, transport speed and surrounding temperature in such a way that evaporation S18 is possible during transport.

Then, in a further step, curing S16 of the liquid and now at least partially matted layer takes place.

For this purpose, the workpiece, in particular the liquid layer, can again be irradiated with electromagnetic radiation from the same radiation source as that used in step S14. Alternatively, other radiation sources can be provided, or other types of curing, such as active or passive air drying, or irradiation with electrical radiation can be used.

Figure 8:
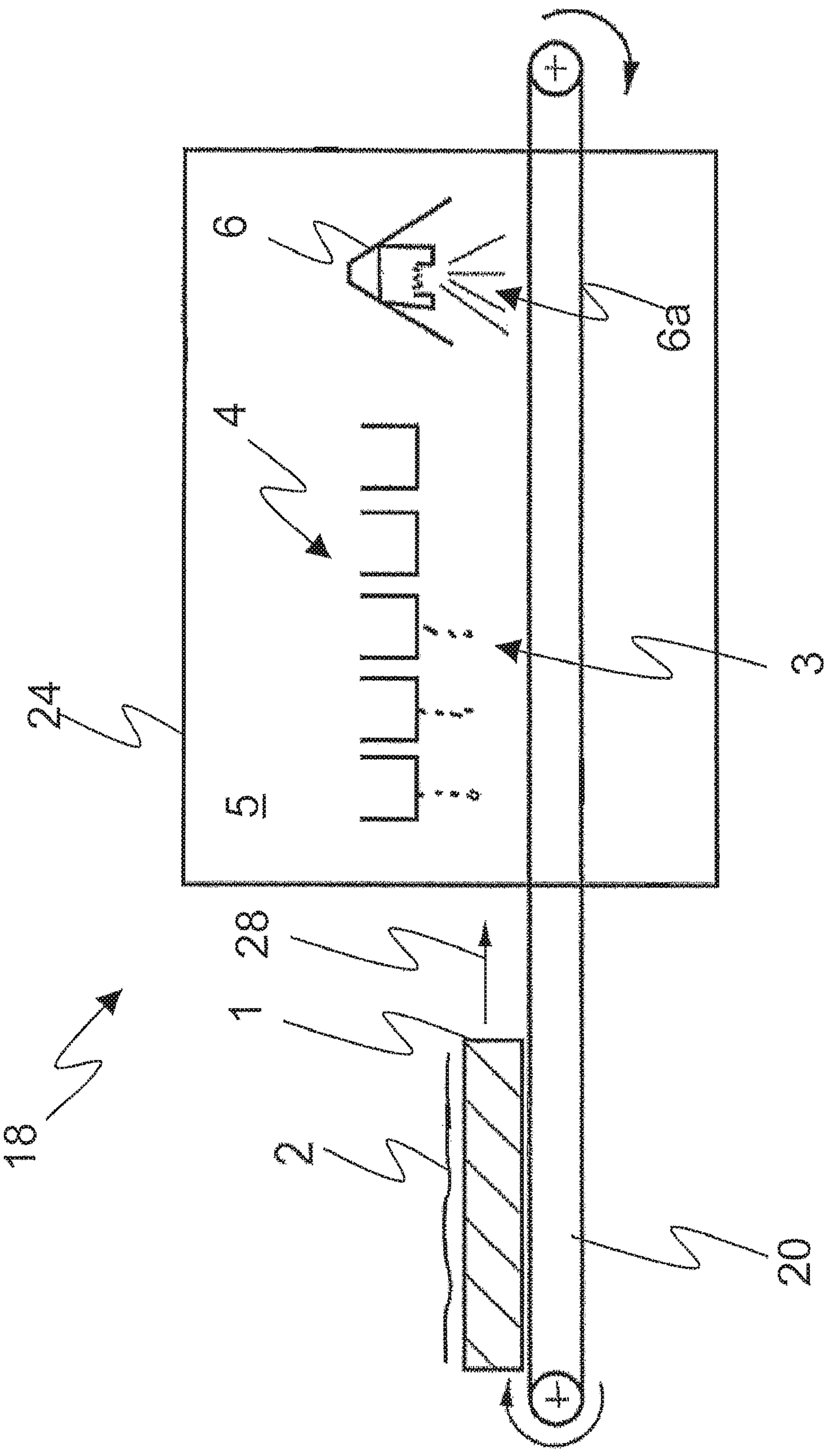
FIG. 8 shows schematically an arrangement of a preferred embodiment of an apparatus according to the invention.

FIG. 8 shows a schematic arrangement of a preferred embodiment of an apparatus 18 according to the invention.

A transport device 20, which is implemented as a belt transport, is shown, on which a workpiece 1 is transported in transport direction 28. A liquid layer 2 is applied to the top of workpiece 1.

During the following transport sequence, workpiece 1 is transported in transport direction 28 into a protective gas chamber 24. It contains a protective gas atmosphere, in particular an inert gas atmosphere, for example a nitrogen atmosphere, in its inside 5, whereby in particular oxygen can be kept away from the liquid layer 2, whereby unwanted chemical reactions are avoided.

Furthermore, digital print heads 4 are provided in the inside 5 of the protective gas chamber 24, which are adapted to apply to the liquid layer 2 an agent which is capable of at least partially absorbing electromagnetic radiation. In the shown illustration, this is done by applying droplets 3, whereby the digital print heads 4 are adapted to control the dispensing of droplets, in particular with regard to droplet speed, volume and impulse.

Alternatively or additionally, the agent can also be applied from the digital print heads 4 in the form of fine droplets 3*a*, which are distributed as evenly as possible on the surface of the liquid layer 2 and in particular join together to form partial areas.

A radiation source 6 is arranged downstream of the digital print heads 4, which is adapted to emit electromagnetic radiation 6*a* with a wavelength of in particular less than 300 nm, preferably less than 250 nm, particularly preferably less than 200 nm, onto the surface of liquid layer 2 in order to achieve the matting as described above.

Furthermore, a control means (not shown) is provided which is adapted to control the apparatus 18 and its elements in order to carry out the method according to the invention.

The embodiments shown here do not restrict the subject matter of the invention. Rather, other embodiments are conceivable. For example, the method described in FIG. 7 may also include further method steps, or individual method steps may be exchanged or omitted. In the following, further aspects of the invention are to be specified on the basis of further concrete examples.

EXAMPLE 1

An HDF board is coated with a white print primer. The thus coated board is fed to a digital printer (in an alternative embodiment also to a rotary printing machine with several colours) and printed decoratively with a wood decor, for example. In an alternative embodiment form, an intermediate layer of lacquer or primer, ideally one that is transparent, can be applied to the thus printed decorative layer. Then a liquid layer 2 with a layer thickness of 50-80 μm is applied. This layer can be applied in a roller application machine or in an alternative embodiment also in a spraying machine. The layer consists of a UV-curing acrylate mixture. The thus coated HDF board is fed to another printing station in which droplets 3 are sprayed onto parts of the surface from digital print heads. In the embodiment shown here, these droplets consist of an aqueous mixture.

In an alternative embodiment, the droplets can also consist of a solvent- or acrylate-based liquid.

The droplets change the surface of the still liquid layer at the areas where they impacted in such a way that they displace the still liquid layer 2 due to a high speed of 4-6 m/sec.

Then the workpiece with the thus modified liquid layer 2 is fed to a radiation source 6, which emits electromagnetic radiation 6*a* with a wavelength of <250 nm onto the surface. This electromagnetic radiation is at least partially absorbed by the droplets 3 and reaches the underlying layer 2. The layer 2 begins to polymerize in its surface and thereby folds (cf. reference sign 7 in FIG. 3). In the deeper areas where the droplets 3 have at least partially absorbed the electromagnetic radiation, a lower polymerization and thus a lower folding occurs at the areas 8 in FIG. 3.

In this way, the desired product is obtained with different gloss levels or mattness in the pores or outside the pores. The workpiece is then fed to another UV radiation source with a wavelength >300 nm to completely cure the underlying, still liquid layer 2, in particular the acrylate layer.

What is claimed is:

1. A method for producing a decorative surface on a workpiece (1), comprising:

feeding (S10) the workpiece (1) coated with a liquid layer (2) to a digital printing station;

applying (S12) an agent capable of at least partially absorbing electromagnetic radiation, at least on a partial area of the surface of the liquid layer (2), or which, in contact with the surface, produces a reaction product which is capable of at least partially absorbing electromagnetic radiation; and irradiating (S14) the surface of the liquid layer (2) and of the agent with electromagnetic radiation having a wavelength of less than 300 nm;

for a formation of a microstructure or nanostructure at the partial area of the surface of the liquid layer (2);

wherein the agent undergoes a chemical reaction with the layer (2);

wherein the chemical reaction occurs in at least one of the following:

(a) upon impact on the surface of the layer (2) in such a way that an optical and/or haptic change of the surface occurs at the respective areas, (b) when the chemical reaction between the applied agent and the layer (2) is given sufficient time for the chemical reaction to at least partially take place, and (C) upon impact on the layer (2) such that the reaction product achieves by the irradiation (S14) at this area no or less micro- or nanostructure formation than on the areas on which no agent has been applied to the surface.

2. The method according to claim 1, wherein the agent is sprayed onto the liquid layer (2), by a digital print head (4) or a digital nozzle bar, in the form of fine droplets (3*a*) and/or applied in the form of droplets (3), wherein the fine droplets (3*a*) have a volume of 0,1 pl to 1 pl and/or the droplets (3) have a volume of 1 pl to 80 pl and/or the chemical and/or physical properties of the agent are such that it absorbs at least 10% of incident electromagnetic radiation.

3. The method according to claim 2, wherein the droplets (3) and/or the fine droplets (3*a*) are dispensed in such a way that upon impact on the surface of the liquid layer (2) they at least partially penetrate it and/or come to rest on it and/or displace it and introduce depressions, wherein the droplets (3) and/or the fine droplets (3*a*) are adapted in volume and/or speed in order to influence the penetration depth and the displacement.

4. The method according to claim 1, wherein the liquid layer (2) consists of a polymerizable acrylate mixture, and/or the applied agent consists of a polymeriable acrylate mixture and/or of a solvent-containing liquid or of an aqueous mixture, with a water content of more than 30%.

5. The method according to claim 1, wherein in a further step, curing (S16) of the layer (2) is carried out by irradiation with electromagnetic radiation, having a wavelength greater than 250 nm and/or by active and/or passive drying and/or by reaction curing.

6. The method according to claim 1, wherein the applied agent consists only of water or, in addition to water having a total content of 10-99%, contains at least one of the following ingredients in the indicated concentration (vol %):

a substance from the group of hindered amines in a concentration of 0-20% a substance from the group of N,N'-diphenyleoxamides in a concentration of 0-2.0% and/or the applied agent comprises, in addition to an alcohol and/or a glycol having a total content (alcohol and/or glycol) of 10-99%, at least one of the following ingredients in the indicated concentration (vol %):

a substance from the group of hindered amines in a concentration of 0-20% a substance from the group of N,N'-diphenyleoxamides in a concentration of 0-20%, and/or the applied agent comprises, in addition to a polymer content of 10-99%, at least one of the following ingredients in the indicated concentration (vol %):

a substance from the group of benzophenones in a concentration of 0-15% a substance from the group of benzotrialzoles in a concentration of 0-15%.

7. The method according to claim 1, wherein the applied agent, after irradiation (S14), is capable of evaporating within less than 3 minutes, and/or in that a further step (S18) is provided in which the evaporation of the agent is carried out within less than 3 minutes.

8. The method according to claim 1, wherein upon impact on the layer (2), the applied agent undergoes a chemical reaction with the layer (2) such that the reaction product achieves by the irradiation (S14) at this area no or less micro- or nanostructure formation than on the areas on which no agent has been applied to the surface.

9. The method according to claim 1, wherein in a further step (S20) the liquid layer (2) is applied to a surface of the workpiece (1), and/or in a further step (S22) carried out simultaneously with step (S12), the layer (2) is structured by an analog structuring method, using an embossing roller and/or is displaced by analog or digital methods by applying further structuring droplets, wherein depressions are introduced into the layer (2), and/or in a further step a decorative image is applied to the surface of the workpiece (I) and/or to the layer (2), by digital printing, which surface is at least partially cured or which has a surface solidified by polymerization.

10. The method according to claim 1, wherein the electromagnetic radiation has a wavelength of less than 250 nm.

11. The method according to claim 1, wherein the electromagnetic radiation has a wavelength of less than 200 nm.

12. The method according to claim 1, wherein the formation of a microstructure or nanostructure is carried out by irradiation (S14) of the surface of the liquid layer (2) with the electromagnetic radiation in the surface of the uppermost partial area of the liquid layer (2), which in the later use of the workpiece (1) scatters light reflection and thus results in an optically more matte impression.

* * * * *